(12) United States Patent
Buddemeyer et al.

(10) Patent No.: US 12,268,572 B2
(45) Date of Patent: *Apr. 8, 2025

(54) TWIST-LOCK ORTHODONTIC POST

(71) Applicant: Ortho Solutions, LC, Lake St. Louis, MO (US)

(72) Inventors: Darren Buddemeyer, Ladue, MO (US); Matthew Malabey, Wentzville, MO (US)

(73) Assignee: Ortho Solutions, LC, Lake St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,903

(22) Filed: Nov. 8, 2023

(65) Prior Publication Data

US 2024/0074837 A1    Mar. 7, 2024

Related U.S. Application Data

(63) Continuation of application No. 17/692,968, filed on Mar. 11, 2022, now Pat. No. 11,826,222, which is a continuation of application No. 16/866,586, filed on May 5, 2020, now Pat. No. 11,273,013.

(51) Int. Cl.
*A61C 7/36* (2006.01)
*A61C 7/28* (2006.01)

(52) U.S. Cl.
CPC .............. *A61C 7/285* (2013.01); *A61C 7/36* (2013.01)

(58) Field of Classification Search
CPC .............. A61C 7/285; A61C 7/36; A61C 7/28
See application file for complete search history.

(56) References Cited

U.S. PATENT DOCUMENTS

| 2,011,575 A | 8/1935 | Ford |
| 2,104,192 A | 1/1938 | Ford |
| 2,926,422 A | 3/1960 | Wallshein |
| 3,238,619 A | 3/1966 | Brunson et al. |
| 3,798,773 A | 3/1974 | Northcutt |
| 5,183,388 A | 2/1993 | Kumar |
| 6,402,510 B1 | 6/2002 | Williams |

(Continued)

FOREIGN PATENT DOCUMENTS

| CN | 210114519 U | 2/2020 |
| CN | 112545687 A | 3/2021 |

(Continued)

OTHER PUBLICATIONS

Extended European Search Report in EP21799698.2, mailed Jul. 21, 2023, 8 pages.

(Continued)

*Primary Examiner* — Ralph A Lewis
(74) *Attorney, Agent, or Firm* — Lewis Rice LLC

(57) ABSTRACT

An orthodontic post and pin system for secure attachment of a dental appliance to an alignment wire, which also facilitates quick and easy removal and replacement. The system described herein uses a "twist-lock" dental post that is rotated onto, and counter-rotated off of, an alignment wire. The dental post includes structural elements to facilitate the twist-lock functionality, as well as structures for accepting a fastener to secure the alignment wire in place and inhibit unintentional or undesired dislodging.

36 Claims, 5 Drawing Sheets

(56) References Cited

U.S. PATENT DOCUMENTS

| | | | |
|---|---|---|---|
| 7,306,457 | B2 | 12/2007 | Vigolo |
| 7,387,512 | B2 | 6/2008 | Clor |
| 8,807,996 | B2 * | 8/2014 | Benvegnu' ............... A61C 7/00 433/10 |
| 9,393,085 | B2 | 7/2016 | Mohr |
| D794,804 | S | 8/2017 | Buddemeyer |
| 9,797,527 | B2 | 10/2017 | Dworak et al. |
| RE46,646 | E | 12/2017 | Rudman |
| 9,888,984 | B2 | 2/2018 | Rudman |
| 9,901,420 | B2 | 2/2018 | Alauddin et al. |
| 9,987,105 | B2 | 6/2018 | Dupray et al. |
| 9,987,107 | B2 | 6/2018 | Buddemeyer et al. |
| 10,226,312 | B2 | 3/2019 | Khoshnevis et al. |
| 10,231,802 | B2 | 3/2019 | Gualano |
| D848,001 | S | 5/2019 | Buddemeyer et al. |
| 10,456,219 | B2 | 10/2019 | Buddemeyer et al. |
| 10,716,646 | B2 | 7/2020 | Dischinger et al. |
| D940,878 | S * | 1/2022 | Buddemeyer ................ D24/180 |
| 11,273,013 | B2 * | 3/2022 | Buddemeyer ............ A61C 7/28 |
| 11,826,222 | B2 * | 11/2023 | Buddemeyer .......... A61C 7/285 |
| 2006/0046225 | A1 | 3/2006 | Cacchiotti et al. |
| 2006/0069389 | A1 * | 3/2006 | Knopfle ............... A61C 8/0031 606/328 |
| 2006/0234180 | A1 | 10/2006 | Huge et al. |
| 2008/0014544 | A1 | 1/2008 | Nucera |
| 2012/0028207 | A1 | 2/2012 | Cleary et al. |
| 2013/0177861 | A1 | 7/2013 | Hayes |
| 2013/0280670 | A1 | 10/2013 | Edgren |
| 2014/0020691 | A1 | 1/2014 | Sweeney et al. |
| 2014/0045137 | A1 | 2/2014 | Solano Reina et al. |
| 2014/0120489 | A1 | 5/2014 | Klein et al. |
| 2014/0224257 | A1 | 8/2014 | Abramson |
| 2015/0210014 | A1 | 7/2015 | Hultgren |
| 2016/0175072 | A1 | 6/2016 | Andreiko et al. |
| 2017/0000588 | A1 | 1/2017 | Alauddin et al. |
| 2017/0128170 | A1 | 5/2017 | Dischinger et al. |
| 2017/0296306 | A1 | 10/2017 | Edgren |
| 2018/0206943 | A1 | 7/2018 | Buddemeyer et al. |
| 2018/0250099 | A1 | 9/2018 | Lai et al. |
| 2018/0318047 | A1 | 11/2018 | Kesling |
| 2019/0021821 | A1 | 1/2019 | Jasper |
| 2019/0282345 | A1 | 9/2019 | Friebauer et al. |
| 2020/0046466 | A1 | 2/2020 | Yukita et al. |
| 2021/0137641 | A1 | 5/2021 | Phan et al. |
| 2021/0186663 | A1 | 6/2021 | Alexander |
| 2021/0346128 | A1 * | 11/2021 | Buddemeyer .......... A61C 7/285 |
| 2022/0233278 | A1 * | 7/2022 | Buddemeyer ............ A61C 7/28 |
| 2024/0074837 | A1 * | 3/2024 | Buddemeyer .......... A61C 7/285 |

FOREIGN PATENT DOCUMENTS

| | | |
|---|---|---|
| DE | 3423106 C2 | 9/1985 |
| DE | 102007039761 B4 | 6/2012 |
| EP | 1712203 A1 | 10/2006 |
| GB | 2575488 A | 1/2020 |
| WO | 2010129385 A2 | 11/2010 |
| WO | 2020011647 A1 | 1/2020 |

OTHER PUBLICATIONS

International Search Report and Written Opinion issued for PCT/US2021/030893, mailed Aug. 23, 2021, 9 pages.

Extended European Search Report in EP24171453.4, mailed Sep. 13, 2024, 8 pages.

Examination Report in EP19810811.0, mailed Jul. 18, 2024, 4 pages.

* cited by examiner

PRIOR ART

TWIST-LOCK ORTHODONTIC POST

CROSS-REFERENCE TO RELATED APPLICATIONS

This application is a continuation of U.S. Utility patent application Ser. No. 17/692,968, filed Mar. 11, 2022, which is a continuation of U.S. Utility patent application Ser. No. 16/866,586, filed May 5, 2020. The entire disclosure of all the foregoing documents are incorporated herein by reference.

BACKGROUND OF THE INVENTION

Field of the Invention

This disclosure is related to the field of orthodontic appliances. In particular, it relates to a twist-lock pin and post system that facilitates quick and easy installation, adjustment, and removal.

Description of the Related Art

Orthodontics is a dentistry specialty focused on the treatment of medical conditions related to the placement and orientation of teeth. Human teeth often grow into misaligned positions and orientations, which can result in an unattractive, jagged appearance. Additionally, jaw misalignment can result in overbites, underbites, and other conditions. Serious cases can impact function and present negative health consequences. In severe instances, facial surgery may be required. However, most cases are addressed by mechanical correction using an orthodontic or dental appliance, known colloquially as "braces."

Orthodontic braces are mechanical devices affixed to the teeth and tensioned to apply consistent pressure over a long period of time to gradually realign the teeth or jaw. Braces have a number of components. First, braces include a set of brackets, which are small squares bonded directly to the teeth, such as by using a dental bonding agent and/or by attaching an orthodontic band. The bonding agent is a strong adhesive suitable for exposure to the environment of the mouth. Orthodontic bands typically wrap around the tooth and provide an anchor for the brackets. In some applications, the patient may have brackets but no bands.

Another significant component of dental braces is the guide wire, sometimes also known as an arch wire or an alignment wire. Such wires are usually anchored to the backmost teeth and attached to each bracket. The wire provides the movement path desired for correction. Many dental brace systems include other appliances, such as rubber bands, springs, and headgear, which can be used to apply additional pressure to facilitate alignment correction. The bracket/alignment wire components are typically connected directly to the teeth, and can then support other parts of the appliance, such as biasing springs or a Herbst appliance.

It is often the case that, over the course of treatments, the brace system and certain appliances used therewith need to be partially or fully disassembled. This involves removing springs and other components mounted to the wire, disconnecting the wire, and, in some cases, possibly removing one or more of the brackets. This may be done, for example, to install a larger or smaller appliance, or for final finishing for tooth or jaw movement.

FIG. 1 depicts a prior art example of an orthodontic appliance used for a brace system. As depicted, a bracket having a wire clasp (C) is cemented to each tooth (T) and an alignment wire (W) is applied through each clasp (C), providing support for an orthodontic appliance (A), secured to the top and bottom wires at pivots (P1) and (P2). These pivots have an aperture (not shown) through which the wire (W) passes when the appliance (A) is installed. The depicted appliance (A) is a spring, which may facilitate lower jaw movement. When the appliance (A) must be changed, it is desirable to remove the appliance (A) quickly and easily, and without having to remove the other components.

However, structures which facilitate easy removal of the appliance (A) present difficulties because it is desirable that the appliance (A) only be removed by the orthodontist for therapeutic purposes. If the connection between the appliance (A) and the wire (W) is not firm enough, the appliance (A) may become unintentionally disconnected. This can result in injury to the patient or damage to the appliance (A). It is thus desirable to have a strong connection that is easy to intentionally remove, but hard to unintentionally remove.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a post for attaching to an alignment wire comprising: a cylindrical body having first end and an opposing second end, the body having a center axis and a radius; a bore coaxially disposed through the body from the first end to the second end; a pair of generally L-shaped locking elements attached to the second end, each of the locking elements comprising: a flange arm attached to and extending perpendicularly from the second end, the flange arm having a generally arcuate exterior surface coaxial and co-radial with the body, and an opposing planar interior surface; and a flange attached to and extending perpendicularly from the flange arm, the flange being a segment of the cylindrical body and having an arcuate exterior surface coaxial and co-radial with the body, the arcuate exterior surface having opposing ends connected by a planar chord surface, and the flange having a planar surface distal the second end and an opposing surface proximal the second end; wherein each of the flange arms is attached to the second end at opposing sides of the center axis; wherein the chord surfaces are in an opposing parallel configuration defining a center channel extending from the distal surfaces to the proximal surfaces of the flanges, the center channel perpendicular to and passing through the center axis; and wherein a gap between the second end of the body and each of the flange proximal surfaces defines a pair of opposing locking recesses having a first end in communication with the center channel and an opposing second end adjacent the interior surface of the each flange arm; and wherein, when an alignment wire is passed through the center channel, the alignment wire is disposed at the second end such that rotating the body causes the flanges to capture the alignment wire in the locking recesses.

On an embodiment of the post, when an alignment wire is passed through the center channel and the body is rotated to cause the flanges to capture the alignment wire in the locking recesses, the alignment wire is adjacent each of the flange arm interior surfaces.

In another embodiment of the post, each of the proximal surfaces of the flanges comprises a detent adjacent the each flange arm.

In another embodiment of the post, each of the detents is sized and shaped to receive and retain an alignment wire.

In another embodiment of the post, each of the detents is sized and shaped to inhibit the movement of an alignment wire retained in the detent.

In another embodiment of the post, the bore is sized and shaped to receive a fastener.

In another embodiment of the post, the bore is sized and shaped to receive a threaded fastener.

In another embodiment of the post, when an alignment wire is captured in the locking recesses, the alignment wire intersects the center axis, and when a fastener is received in the bore, the fastener holds the alignment wire against the proximal surfaces of the flanges.

In another embodiment of the post, the post further comprises an annular gripping element coaxial with the body and having a radius larger than the body such that the gripping element circumscribes the body, the gripping element truncated at opposing sides by two parallel chords.

In another embodiment of the post, the truncated chords are sized and shaped to receive torque from an orthodontic wrench.

Also described herein, among other things, is a method of interfacing a post and an alignment wire comprising: providing an alignment wire; providing a fastener; providing a post comprising: a cylindrical body having first end and an opposing second end, the body having a center axis and a radius; a bore coaxially disposed through the body from the first end to the second end, the hollow interior bore sized and shaped to receive the fastener; a pair of generally L-shaped locking elements attached to the distal end, each of the locking elements comprising: a flange arm attached to and extending perpendicularly from the second end, the flange arm having a generally arcuate exterior surface coaxial and co-radial with the body, and an opposing planar interior surface; and a flange attached to and extending perpendicularly from the flange arm, the flange being a segment of the cylindrical body and having an arcuate exterior surface coaxial and co-radial with the body, the arcuate exterior surface having opposing ends connected by a planar chord surface, and the flange having a planar surface distal the second end and an opposing surface proximal the second end; wherein each of the flange arms is attached to the second end at opposing sides of the center axis; wherein the chord surfaces are in an opposing parallel configuration defining a center channel extending from the distal surfaces to the proximal surfaces of the flanges, the center channel perpendicular to and passing through the center axis; and wherein a gap between the second end of the body and each of the flange proximal surfaces defines a pair of opposing locking recesses having a first end in communication with the center channel and an opposing second end adjacent the interior surface of the each flange arm; passing the alignment wire through the center channel until the alignment wire is disposed at the second end; rotating the body to cause the flanges to capture the alignment wire in the locking recesses; and inserting the fastener through the bore until the fastener holds the alignment wire against the proximal surfaces of the flanges.

In an embodiment of the method, the rotating further comprises rotating the body to cause the wire to be adjacent each of the flange arm interior surfaces.

In another embodiment of the method, the method further comprises: in the providing a post, each of the proximal surfaces of the flanges comprises a detent adjacent the each flange arm; and the rotating further comprises rotating the body to cause the alignment wire to be received by each of the detents.

In another embodiment of the method, the method further comprises: in the providing a post, the post further comprising an annular gripping element coaxial with the body and having a radius larger than the radius of the body such that the gripping element circumscribes the body, the gripping element truncated at opposing sides by two parallel chords; the rotating further comprises rotating the body by applying an orthodontic wrench to the truncated chords.

In another embodiment of the method, the method further comprises: after the inserting the fastener, removing the fastener from the bore; after the rotating, counter-rotating the body until the alignment wire is not disposed in the locking recesses and is generally parallel with the channel; and removing the post from the alignment wire.

Also described herein, among other things, is an orthodontic post and pin system comprising: a fastener; a post comprising: a cylindrical body having first end and an opposing second end, the body having a center axis and a radius; a bore coaxially disposed through the body from the first end to the second end and sized and shaped to receive the fastener; a pair of generally L-shaped locking elements attached to the distal end, each of the locking elements comprising: a flange arm attached to and extending perpendicularly from the second end, the flange arm having a generally arcuate exterior surface coaxial and co-radial with the body, and an opposing planar interior surface; and a flange attached to and extending perpendicularly from the flange arm, the flange being a segment of the cylindrical body and having an arcuate exterior surface coaxial and co-radial with the body, the arcuate exterior surface having opposing ends connected by a planar chord surface, and the flange having a planar surface distal the second end and an opposing surface proximal the second end; wherein each of the flange arms is attached to the second end at opposing sides of the center axis; wherein the chord surfaces are in an opposing parallel configuration defining a center channel extending from the distal surfaces to the proximal surfaces of the flanges, the center channel perpendicular to and passing through the center axis; and wherein a gap between the second end of the body and each of the flange proximal surfaces defines a pair of opposing locking recesses having a first end in communication with the center channel and an opposing second end adjacent the interior surface of the each of the flange arms; wherein, when an alignment wire is passed through the center channel, the alignment wire is disposed at the second end such that rotating the body causes the flanges to capture the alignment wire in the locking recesses, and if the fastener is inserted through the center bore, the fastener holds the alignment wire against the proximal surfaces of the flanges.

In an embodiment of the system, when an alignment wire is passed through the center channel and the body is rotated to cause the flanges to capture the alignment wire in the locking recesses, the alignment wire is adjacent each of the flange arm interior surfaces.

In another embodiment of the system, each of the proximal surfaces of the flanges comprises a detent adjacent the each flange arm and sized and shaped to receive an alignment wire and inhibit movement of an alignment wire retained in the detent.

In another embodiment of the system, the system further comprises a generally annular gripping element coaxial with the body and having a radius larger than the radius of the body such that the gripping element circumscribes the body, the gripping element truncated at opposing sides by two parallel chords.

In another embodiment of the system, the truncated chords are sized and shaped to receive torque from an orthodontic wrench.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Described herein, among other things, is an orthodontic post and pin system for secure attachment of a dental appliance to an alignment wire, which also facilitates quick and easy removal and replacement. At a high level of generality, the system described herein uses a "twist-lock" dental post that is rotated onto, and counter-rotated off of, an alignment wire. The dental post includes structural elements to facilitate the twist-lock functionality, as well as structures for accepting a fastener to secure the alignment wire in place and inhibit unintentional or undesired dislodging.

Figure 1:
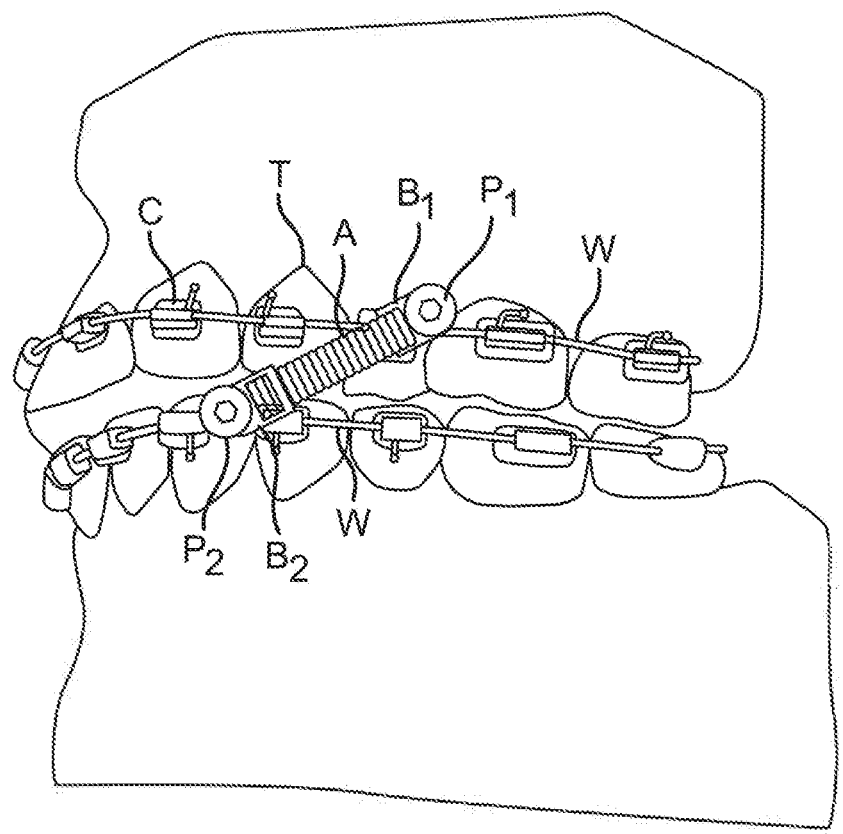
FIG. 1 depicts an embodiment of a prior art dental appliance.
Figure 2:
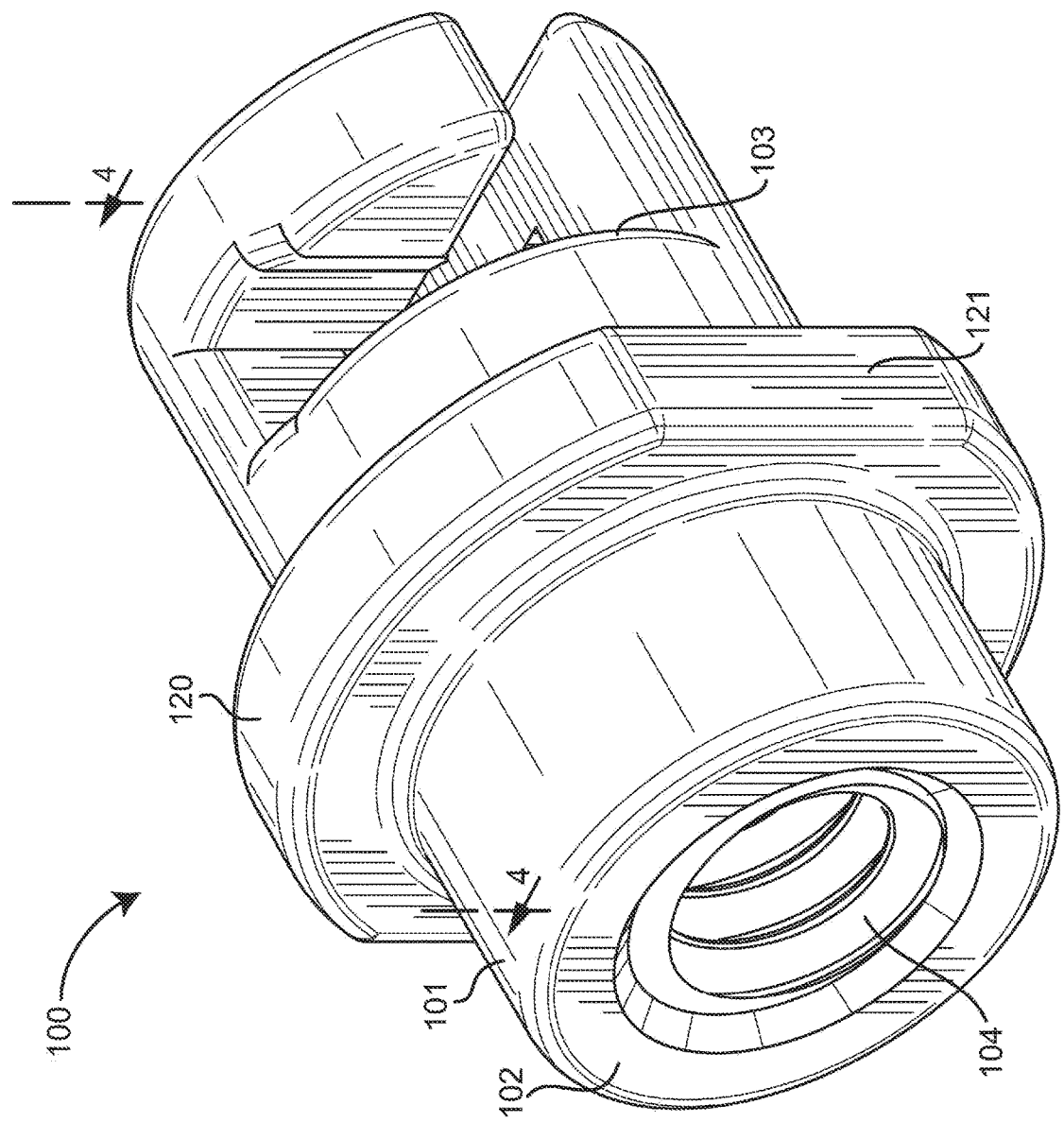
FIG. 2 depicts an embodiment of a twist-lock orthodontic post from a top side perspective view.

FIG. 2 depicts an exemplary embodiment of a dental post as described herein. In the depicted embodiment, the post (100) is generally in the configuration of a cylinder. The depicted post (100) comprises a main body (101) having a first end (102) and an opposing second end (103). In the depicted embodiment, the first end (102) includes a receiving element, which has an aperture (104) providing access to a hollow interior bore (105). In the depicted embodiment, the hollow interior bore (105) is coaxial with the post (100) and extends axially from the outside surface of the first end (102) to the outside surface of the second end (103). The depicted hollow interior bore (105) is sized and shaped to accept a fastener, sometimes also referred to as a pin. In the depicted embodiment, the pin is a screw or threaded element, and, accordingly, the hollow interior bore (105) comprises corresponding threads around the interior circumference to accommodate the corresponding threads of the pin. By way of example, and not limitation, in an embodiment, the hollow interior bore (105) may be sized and shaped to accept the fastener described in U.S. Pat. No. D749,737. This is not limiting, and in an alternative embodiment, a different configuration of fastener may be used.

In the depicted embodiment of FIG. 2, the hollow interior bore (105) has a variable radius, being narrower along the main length and having a wider radius at the first end (102). This facilitates the use of a pin having a wider head than body, which may be screwed into the hollow interior bore (105), recessing the head within the post (100) interior volume and allowing for a flush installation.

Figure 3:
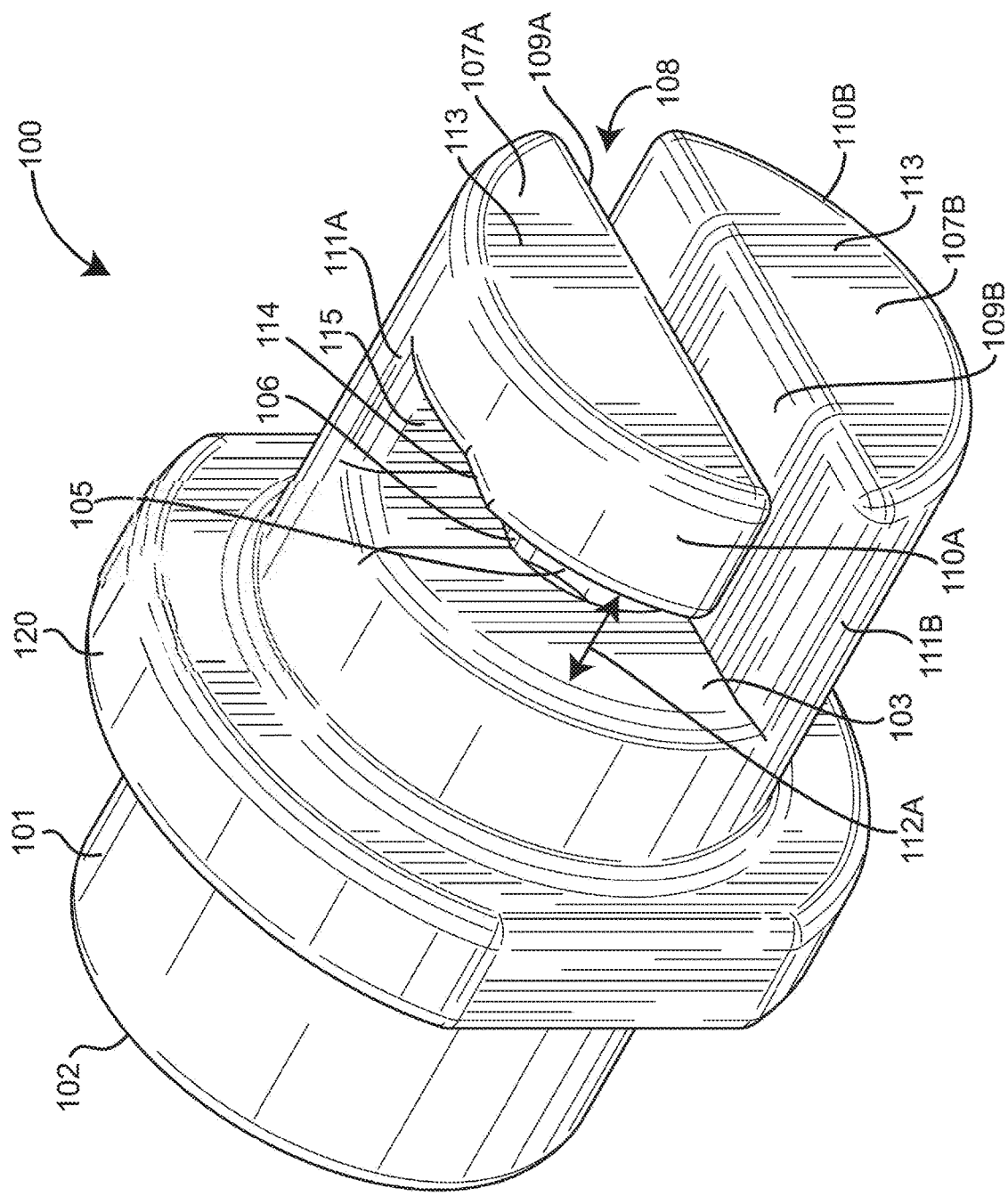
FIG. 3 depicts the embodiment of FIG. 2 from a bottom side perspective view.
Figure 4:
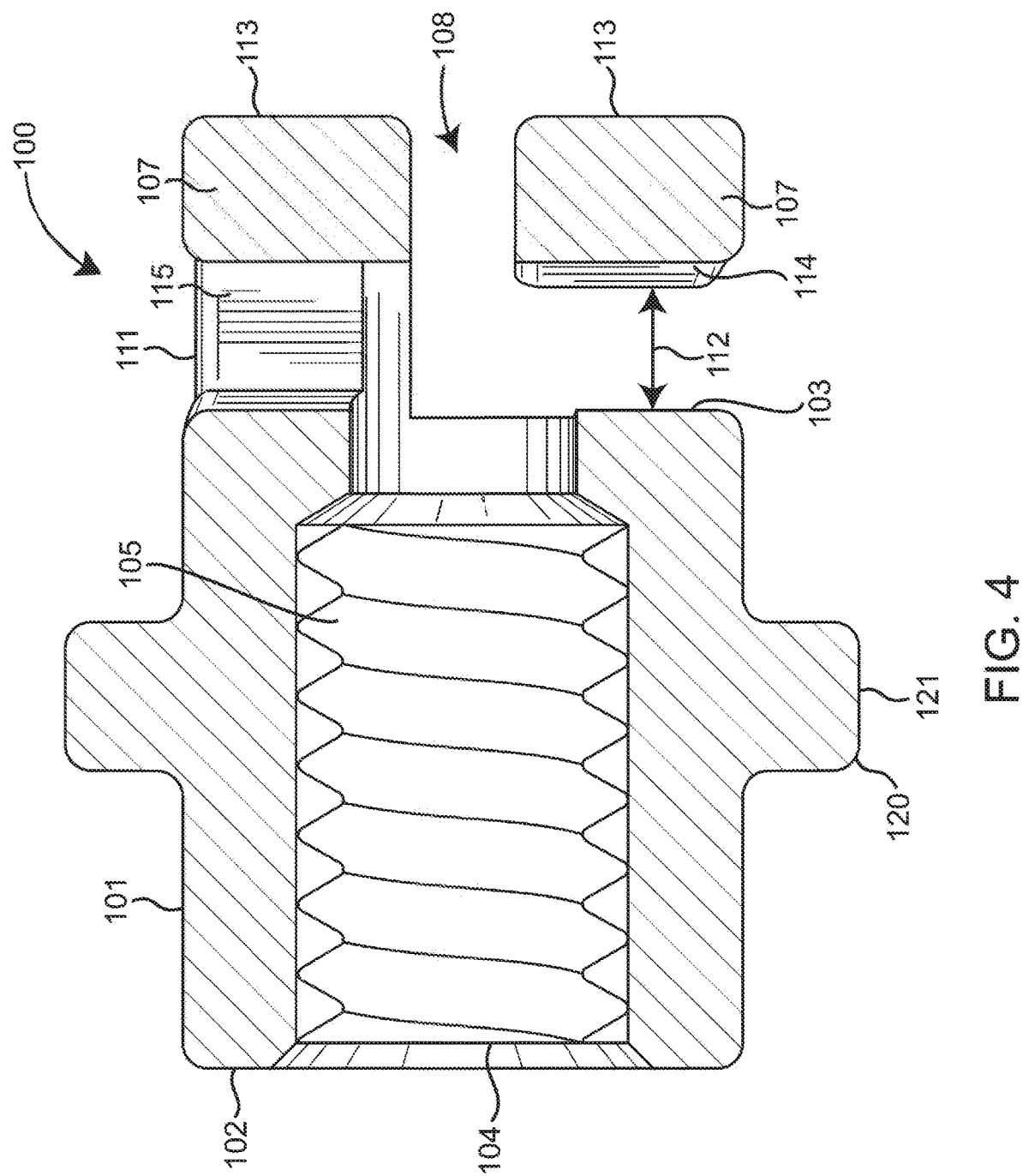
FIG. 4 provides a cutaway side view of the embodiment of FIG. 2.

FIG. 3 depicts the embodiment of FIG. 2 from the bottom, showing the "twist-lock" structure. In the depicted embodiment of FIG. 3, the second end (103) can be seen, including a corresponding aperture (106) for the hollow interior bore (105). As described in further detail elsewhere herein, this facilitates the use of the fastener to pin the alignment wire in place.

As shown in the depicted embodiment of FIG. 3, "twist-lock" elements are affixed to the second end (103). In the depicted embodiment, the twist-lock elements comprise a pair of opposing flanges (107). The depicted flanges (107) are disposed so as to create a central channel (108) formed by opposing faces (109) of the flanges (107). These faces (109) are generally planar surfaces opposing one another in a parallel arrangement. In the depicted embodiment, the channel (108) extends perpendicularly with respect to the main axis of the post (100), and intersects the center axis of the post (100). The depicted flanges (109) are in the configuration of geometric segments of the cylindrical body (101), and have an opposing exterior, arcuate surface (110) connected at the ends by a planar chord surface. These arcuate surfaces (110) are sized, shaped, and dimensioned so as to create the effect of a continuous cylindrical form with the main body (101). That is, they are coaxial and co-radial with the main body (101). In the depicted embodiment, the distal surfaces of the flanges (113) are generally co-planar. This has the overall effect of causing a combination of the main body (101) and the twist-lock elements to appear as a cylinder with the channel (108) and locking recess (112) removed therefrom.

The channel (108) is sized, shaped, and dimensioned to facilitate the passage of an alignment wire. Thus, the thickness of the flanges (107) will be determined generally based upon the dimensions of the alignment wire that will pass between the faces (109) defining the channel (108).

As may be seen in the depicted embodiment of FIG. 3, each of the flanges (107) is attached to the second end (103) by a flange arm (111). The depicted flange arms (111) are generally perpendicularly attached to the second end (103) at opposing positions across the center axis. The depicted flanges (107) are generally attached perpendicularly to their respective flange arms (111). This causes the flanges (107) and flange arms (111) to each have the general configuration of an "L." The depicted flange arms (111) are also co-radial and coaxial with the main body (101).

As can be seen in the depicted embodiment, the depicted flanges (107) have generally the same configuration, but are disposed on opposing ends of the second end (103), causing each (107) to project from its respective flange arm (111) in opposing directions. This in turn causes each of the flanges (107) to define a locking recess (112) defined by the distance between the outside surface of the second end (103) and the proximal surface of each flange (107) the interior surfaces of the flange arms (111) at one end, and being in communication with the channel (108) of the opposing end. The locking recesses (112) are generally sized, shaped, and dimensioned to accept the passage of an alignment wire to facilitate the "twist-lock" function described elsewhere herein.

In the depicted embodiment of FIG. 3, each of the flanges (107) includes a detent (114) disposed along the proximal surface of the flange (113). This detent (114) provides for a wider gap near the interior surface (115) of the flange arm (111) than at the confluence of the locking recess (112) and the channel (108). This has the effect of providing a physical barrier to inhibit unintentional movement of an alignment wire.

Figure 5:
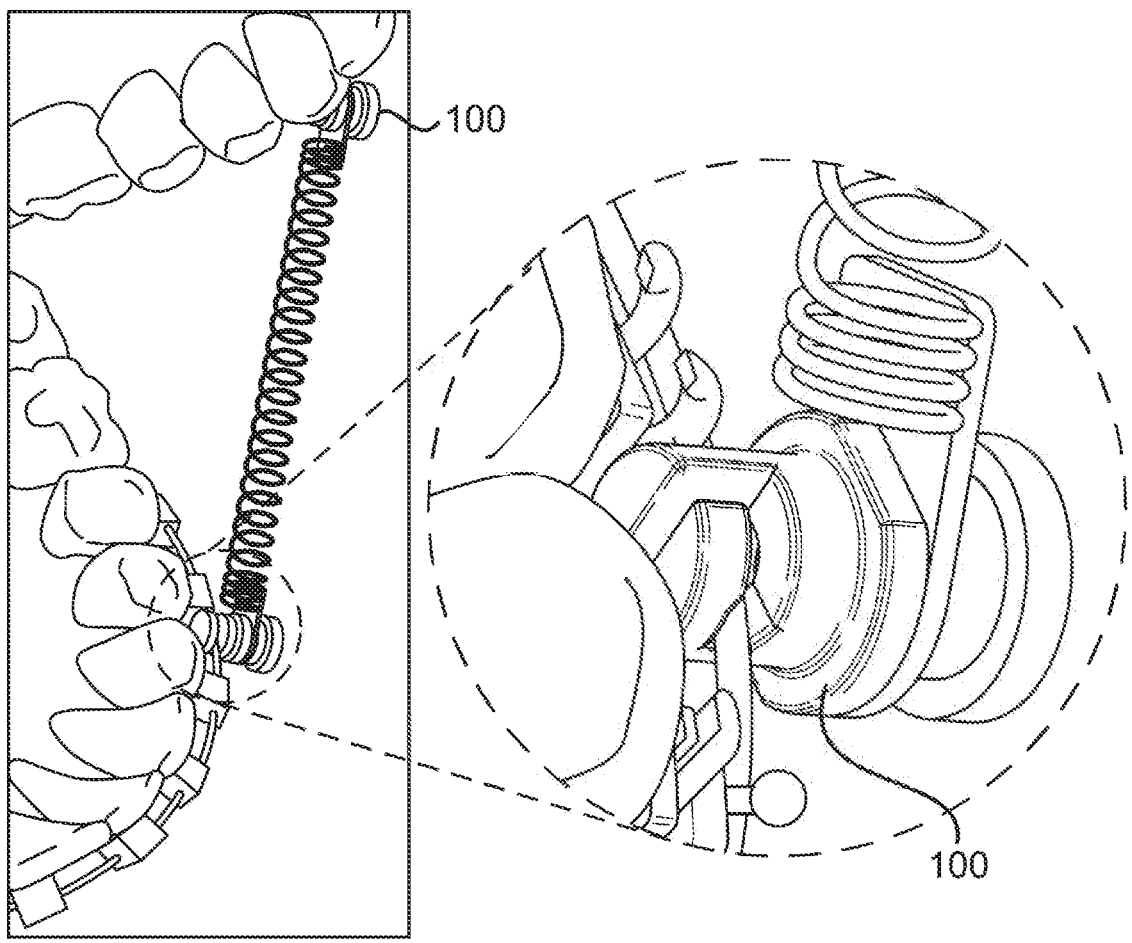
FIG. 5 provides an embodiment of a twist-lock post installed on a dental appliance.

To install and use the depicted post (100), the post (100) is placed over an alignment wire by passing the alignment wire through the channel (108) until it is at or near the second end (103) of the main body (101). This arrangement is depicted in FIG. 5. Next, the post (100) is rotated clockwise, causing the flanges (107) to rotate in opposing directions and pass beneath the alignment wire, which is then captured in the locking recess (112). Rotation continues until the adjustment is adjacent to the interior surfaces (115). In this configuration, the detent (114) assists to hold the wire in place. As can be seen in the depicted embodiment, in this configuration, the alignment wire is generally perpendicular to the major axis of the post (100) and intersects the central axis of the post (100).

Next, a pin may be screwed into the post (100) from the first end (102). As the pin is screwed in, its distal end exits the aperture (106) in the second end (103), and contacts the wire. The pin is then tightened to hold the wire in place from the top. Once installed, the s flanges (113) inhibit the wire from becoming disconnected from the post (100), and the pressure from the pin holds the wire against the proximal surface of the flanges (107). To remove the post (100), this process is simply reversed. The pin is counter-rotated to unscrew it from the post (100), which releases the pressure on the wire. The post (100) may then be counter-rotated to cause the channel (108) to become parallel with the wire, and the post (100) may then be simply lifted off the alignment wire.

In an embodiment, the post (100) may comprise additional elements, such as, but not necessarily limited to, a gripping element (120) configured to facilitate twisting. Applying torque to a small cylindrical object can be difficult due to slippage and low contact surface area. To overcome this, the depicted embodiment includes a generally annular gripping element (120) which is generally coaxial with the post (100), but which has a larger radius. In the depicted embodiment, the gripping element (120) includes two opposing chords (121) arranged generally in parallel with each other and providing flat gripping services for a fastening tool.

Throughout this disclosure, geometric terms, and relative qualifies such as "generally," "about," and "approximately" may be used, such as, but not necessarily limited to, with respect to shapes, sizes, dimensions, angles, and distances. One of ordinary skill in the art will understand that, in the context of this disclosure, these terms are used to describe an attempt by a person of ordinary skill in the art to cause the component in question to be recognizable as the term in question. By way of example and not limitation, components described as being "generally coplanar" will be recognized by one of ordinary skill in the art to not be actually coplanar in a strict geometric sense because a "plane" is a purely geometric construct that does not actually exist and no component is truly "planer," nor are two components ever truly coplanar.

The use of geometric descriptions herein should be understood as encompassing a reasonable range of variations from the literal geometric meaning, and includes, but is not necessarily limited to, variations resulting from: manufacturing tolerances causing shape variations, deformations, and defects; natural imperfections; non-uniform thermal expansion; natural wear; and other deformations. Further, there exists for every object a level of magnification at which geometric descriptors no longer apply due to the nature of matter. One of ordinary skill in the art will understand how to apply geometric and relative terms in view of these and other context-specific considerations. Also, the use of the conjunctive and disjunctive should not necessarily be construed as limiting, and the conjunctive may include the disjunctive, and vice versa.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. An orthodontic post comprising:
a generally cylindrical body;
a bore axially disposed through said body;
a pair of arms extending from opposing sides of an end of said body, said arms having a generally arcuate exterior surface; and
a flange extending from each of said two arms, each of said flanges having an arcuate exterior surface having opposing ends connected by a chord surface;
wherein each of said flanges comprises a detent.

2. The post of claim 1, wherein when an alignment wire is passed between said chord surfaces and said body is rotated, said flanges capture said alignment wire in locking recesses defined by a gap between each said end of said flanges.

3. The post of claim 1, wherein each of said detents is sized and shaped to receive and retain an alignment wire.

4. The post of claim 3, wherein each of said detents is sized and shaped to inhibit the movement of an alignment wire retained in said detent.

5. The post of claim 1, wherein said bore is sized and shaped to receive a threaded fastener.

6. The post of claim 5, wherein when a fastener is received in said bore, said fastener holds said alignment wire against said flanges.

7. The post of claim 1, wherein said body further comprises a gripping element sized and shaped to received torque from an orthodontic wrench.

8. The post of claim 7, wherein said gripping element is an annular element having two opposing planer gripping surfaces.

9. An orthodontic post and pin system comprising the orthodontic pin of claim 1 and a fastener.

10. The system of claim 9, wherein when an alignment wire is passed between said chord surfaces and said body is rotated, said flanges capture said alignment wire in locking recesses defined by a gap between said end each of said flanges.

11. The system of claim 9, wherein each of said flanges comprises a detent.

12. The system of claim 9, wherein said body further comprises a gripping element sized and shaped to received torque from an orthodontic wrench.

13. The system of claim 9, wherein said alignment wire intersects the central axis of said post and said fastener secures said alignment wire against the proximal surface of said flanges.

14. A method of interfacing an orthodontic post and an alignment wire comprising:
   providing an alignment wire;
   providing an orthodontic post comprising:
      a generally cylindrical body;
      a bore axially disposed through said body;
      a pair of arms extending from opposing sides of an end of said body, said arms having a generally arcuate exterior surface; and
      a flange extending from each of said two arms, each of said flanges having an arcuate exterior surface having opposing ends connected by a chord surface;
      wherein each of said flanges comprises a detent;
   passing said alignment wire between said chord surfaces until said alignment wire is disposed at said end;
   rotating said body to cause said flanges to capture said alignment wire in locking recesses defined by a gap between said end of each said flanges and to cause said alignment wire to be received by each of said detents.

15. The method of claim 14, wherein when an alignment wire is passed through a center channel, said alignment wire is disposed at said end of said flanges such that rotating said body causes said flanges to capture said alignment wire in said locking recesses and said alignment wire to be adjacent each of said arms.

16. The method of claim 14, further comprising:
   in said providing an orthodontic post, said post further comprising a gripping element sized and shaped to received torque from an orthodontic wrench; and
   said rotating further comprises rotating said body by applying an orthodontic wrench to said gripping element.

17. The method of claim 14, further comprising:
   providing a fastener; and
   inserting said fastener through said bore until said fastener holds said alignment wire against said flanges.

18. The method of claim 17, further comprising:
   after said inserting said fastener, removing said fastener from said bore;
   after said rotating, counter-rotating said body until said alignment wire is not disposed in said locking recesses and is generally parallel with said center channel; and
   removing said post from said alignment wire.

19. An orthodontic post comprising:
   a generally cylindrical body;
   a bore axially disposed through said body;
   a pair of arms extending from opposing sides of an end of said body, said arms having a generally arcuate exterior surface;
   a flange extending from each of said two arms, each of said flanges having an arcuate exterior surface having opposing ends connected by a chord surface;
   wherein when a fastener is received in said bore, said fastener holds said alignment wire against said flanges.

20. The post of claim 19, wherein when an alignment wire is passed between said chord surfaces and said body is rotated, said flanges capture said alignment wire in locking recesses defined by a gap between each said end of said flanges.

21. The post of claim 19, wherein each of said flanges comprises a detent.

22. The post of claim 19, wherein each of said detents is sized and shaped to receive and retain an alignment wire.

23. The post of claim 21, wherein each of said detents is sized and shaped to inhibit the movement of an alignment wire retained in said detent.

24. The post of claim 19, wherein said bore is sized and shaped to receive a threaded fastener.

25. The post of claim 19, wherein said body further comprises a gripping element sized and shaped to received torque from an orthodontic wrench.

26. The post of claim 25, wherein said gripping element is an annular element having two opposing planer gripping surfaces.

27. An orthodontic post and pin system comprising the orthodontic pin of claim 21 and a fastener.

28. The system of claim 27, wherein when an alignment wire is passed between said chord surfaces and said body is rotated, said flanges capture said alignment wire in locking recesses defined by a gap between said end each of said flanges.

29. The system of claim 27, wherein each of said flanges comprises a detent.

30. The system of claim 27, wherein said body further comprises a gripping element sized and shaped to received torque from an orthodontic wrench.

31. The system of claim 27, wherein said alignment wire intersects the central axis of said post and said fastener secures said alignment wire against the proximal surface of said flanges.

32. A method of interfacing an orthodontic post and an alignment wire comprising:
   providing an alignment wire;
   providing an orthodontic post comprising:
   a generally cylindrical body;
   a bore axially disposed through said body;
   a pair of arms extending from opposing sides of an end of said body, said arms having a generally arcuate exterior surface; and
   a flange extending from each of said two arms, each of said flanges having an arcuate exterior surface having opposing ends connected by a chord surface;
   providing a fastener;
   passing said alignment wire between said chord surfaces until said alignment wire is disposed at said end;
   rotating said body to cause said flanges to capture said alignment wire in locking recesses defined by a gap between said end of each said flanges; and
   inserting said fastener through said bore until said fastener holds said alignment wire against said flanges.

33. The method of claim 32, wherein when an alignment wire is passed through a center channel, said alignment wire is disposed at said end of said flanges such that rotating said body causes said flanges to capture said alignment wire in said locking recesses and said alignment wire to be adjacent each of said arms.

34. The method of claim 33, further comprising:
   in said providing an orthodontic post, each of said flanges comprises a detent; and
   said rotating further comprises rotating said body to cause said alignment wire to be received by each of said detents.

35. The method of claim 32, further comprising:
   in said providing an orthodontic post, said post further comprising a gripping element sized and shaped to received torque from an orthodontic wrench; and
   said rotating further comprises rotating said body by applying an orthodontic wrench to said gripping element.

36. The method of claim 32, further comprising:
after said inserting said fastener, removing said fastener from said bore;
after said rotating, counter-rotating said body until said alignment wire is not disposed in said locking recesses and is generally parallel with said center channel; and
removing said post from said alignment wire.

\* \* \* \* \*